United States Patent [19]

Imai et al.

[11] Patent Number: 4,744,957
[45] Date of Patent: May 17, 1988

[54] APPARATUS FOR REMOVING VOLATILE MATTERS CONTAINED IN POLYMERS

[75] Inventors: Shigehiro Imai, Chiba; Hirokuni Mihara, Tokyo; Junichi Yoshida, Sakura; Masao Omori; Hiroshi Kurokawa, both of Ichihara, all of Japan

[73] Assignees: Mitsui Engineering & Shipbuilding Co., Ltd.; Idemitsu Petrochemical Co., Ltd., both of Tokyo, Japan

[21] Appl. No.: 15,396

[22] Filed: Feb. 17, 1987

[51] Int. Cl.$^4$ .......................... B01D 1/22; B01D 1/28
[52] U.S. Cl. .................... 422/138; 159/2.1; 159/13.1; 159/27.4; 159/DIG. 10
[58] Field of Search .......... 422/131, 134, 138; 425/378 S; 528/501; 159/2.1, 13.1, 27.4, 23, DIG. 10, DIG. 16, DIG. 32; 165/167

[56] References Cited

U.S. PATENT DOCUMENTS

| | | | |
|---|---|---|---|
| 3,704,100 | 11/1972 | Twilley et al. | 422/134 |
| 3,853,672 | 12/1974 | Gordon et al. | 159/27.4 |
| 3,927,983 | 12/1975 | Gordon et al. | 422/134 |
| 3,928,300 | 12/1975 | Hagberg | 528/501 |
| 4,153,501 | 5/1979 | Fink et al. | 528/501 |
| 4,294,652 | 10/1981 | Newman | 528/501 |
| 4,328,186 | 5/1982 | Karam | 422/138 |
| 4,537,954 | 8/1985 | Ando et al. | 528/501 |

FOREIGN PATENT DOCUMENTS 48-29797  9/1973  Japan.
51-134781 11/1976 Japan.

Primary Examiner—Barry S. Richman
Assistant Examiner—Joye L. Woodard
Attorney, Agent, or Firm—Armstrong, Nikaido, Marmelstein & Kubovcik

[57] ABSTRACT

Disclosed is apparatus for treating polymers containing volatile matters and removing the volatile matters from the polymers, which comprises a polymer discharge device provided with heating means and adapted to discharge a polymer charged therein in the form of a strand or film and so forth, which device is mounted inside a decompression vessel or on a wall of the vessel.

10 Claims, 7 Drawing Sheets

APPARATUS FOR REMOVING VOLATILE MATTERS CONTAINED IN POLYMERS

BACKGROUND OF THE INVENTION

The present invention relates to apparatus for treating polymers such as styrenic type polymers and so forth and removing volatile matters contained in the polymers, such as solvents, monomers and so forth, at a high efficiency within a short period of time.

Generally, it is rare that polymers such as styrenic type polymers and so forth obtained from a polymerization step have been completely polymerized, and in most cases the polymers contain volatile matters such as unreacted monomers, solvents and so forth. Such volatile matters lower or adversely affect the quality of polymers and lower the quality of products to be obtained from the polymers, so that it is necessary to remove them within a short period of time.

Thus, conventionally it is practised to treat polymers transferred from a polymerization step by or through apparatus for removing volatile matters from the polymers and thereby improve the quality of the polymers. Then, in or with the known apparatus for removing volatile matters from polymers [e.g., Japanese patent publication No. 48-29797 and Japanese patent application Kokai (=laying-open) publication No. 51-134781], polymers containing volatile matters are subjected to a foaming or bubbling treatment and thereby dispersed, then heated through a vertical-type multi-piped heat exchanger, and flashed in a gas-liquid separation zone.

With such known treatment apparatus, various inconveniences or difficulties are indicated, for example such as follows:
(a) It is indispensable to subject polymers to a foaming or bubbling treatment.
(b) Removal of volatile matters cannot be effected at a satisfactory efficiency.
(c) The treating apparatus is disadvantageously great in size and complex in structure.
(d) It is necessary to take a step for removing the used foaming or bubbling agent.

SUMMARY OF THE INVENTION

It is a primary object of the present invention to obviate the above indicated difficulties or inconveniences with the prior art apparatus for removing volatile matters from polymers containing such matters, and enhance the efficiency of the operation for removing volatile matters from polymers.

It is another object of the invention to effect a reduction of the overall structural size of apparatus for removing volatile matters from polymers.

To attain the above objects, the present invention provides apparatus for removing volatile matters contained in a polymer, which is characterized by comprising a polymer discharge device provided with heating means and adapted to discharge a polymer charged therein in the form of a strand or film and so forth, the polymer discharge device being mounted inside a decompression vessel or on a wall of the vessel.

With the apparatus of the above arrangement according to the present invention, it is feasible to obtain a large surface area of the polymer discharged from the polymer discharge device, whereby the evaporation of volatile matters can be promoted to result in that the efficiency of the removal of volatile matters is enhanced in comparison to the cases with conventional apparatus.

Also, according to the arrangement proposed by the present invention, polymers to be treated for removal of volatile matters therefrom can be heated within a short period of time immediately before they are discharged out of the polymer discharge device, so that it can be effectively prevented from occurring that they become changed in their degrees of polymerization or otherwise become degraded. It therefore is possible to realize an improvement in or relating to the quality of products to be produced from the polymers.

Moreover, the polymer discharge device itself is provided with heating means according to the invention, so that a satisfactory heating efficiency can be obtained to increase the quantity of polymers to be heat-treated per unitary length of the operation time in comparison to the prior art, and as a result of this, the size of the polymer discharge device can be reduced and accordingly that of the apparatus for removing volatile matters, as well.

The polymer discharge device in the apparatus according to the invention comprises a main body, a polymer chamber communicated with the main body and heating-medium chambers provided at side ends of the main body, wherein the main body comprises a polymer passage communicated at its one end with the polymer chamber and providing at its other end a discharge opening for discharging the polymer in the form of strand or film, and a heating-medium passage provided adjacent to the polymer passage for heating the latter and having its one end communicated with the heating-medium chambers. The main body of the polymer discharge device comprises polymer passage units each formed by a pair of plates or walls and a wave-shaped fin supported between the pair of plates or walls and each having at least one polymer passage, and heating-medium passage units having a same structure as the above polymer passage units, wherein the polymer passage units and the heating-medium passage units are arranged alternately and in an overlapping relationship. Whereas the polymer passage units and the heating-medium passage units may be arranged in a manner such that the polymer passage of the former and the heating-medium passage of the latter either cross each other at a right angle or lie parallel with each other, preferably the arrangement should be such that the polymer passage and the heating-medium passage are run perpendicular to each other.

The discharge end of respective plates or walls and that of the wave-shaped fin may be disposed in alignment with each other, when the polymer can be discharged in the form of strands or as a number of strand-form products. However, if it is made that the discharge end of the wave-shaped fin does not reach the comparable ends of the plates or walls, then the polymer can be discharged in the form of a film or sheet.

In order to facilitate evaporation of volatile matters in the pressure-reduced or decompression vessel, it may advantageously be devised according to the present invention to mount at the discharge end of the polymer passage unit an orifice plate member formed with discharge orifices of a shape of such as a star, a Y-letter or an X-letter, or any other opening shape which can serve to increase the surface area of the polymer discharged through the orifices.

The wave-shaped fin can be any of a "plain type" one which is wave shaped in cross-section in a most widely known manner among others, a "serrate type" one in which parallel rows of fin members are arranged with phase differences each of a ½ pitch in the flow direction of the fluid (the polymer being treated and the heating-medium in the present invention), a "perforation type" one in which the fin is formed with regularly arranged round apertures, a "herringbone type" one in which the fluid passages are curved in a wave form or zigzag form in the flow direction of the fluid and so forth, but it should preferably be of the "plain type" or the "serrate type".

In order to realize a size reduction of the apparatus for removing volatile matters from polymers, the present invention makes a few proposals.

According to a first one of the proposals, the polymer discharge device is mounted in the decompression vessel and made having a discharge end face which is faced slantingly toward below.

According to a second proposal, the polymer discharge device is mounted on the top wall of the decompression vessel with its discharge end face facing below.

It otherwise is proposed to make the decompression vessel comprising a spindle-shaped body having inclined faces on an upper portion thereof, on which at least one polymer discharge device is secured in a manner of its discharge end face facing the inside of the vessel.

It is further otherwise proposed that a plurality of polymer discharge devices are mounted in the decompression vessel in a radially juxtaposed arrangement.

With regard to polymers which the apparatus of the present invention can effectively treat, there lies no particular limitation, but the polymers should preferably be styrenic type polymers such as homo- or co-polymers of styrenic type monomers such as styrene, vinyl toluene, α-methyl styrene and so forth, copolymers of styrenic type monomers and monomers of acrylonitrile, methyl acrylate, methyl methacrylate, maleic anhydride and so forth, copolymers of styrenic type monomers and their copolymerizable rubber, and so forth.

The above and other objects, features and advantages of the present invention will become apparent from considering the following description of the preferred embodiments of the invention taken in conjunction with the accompanying drawings.

THE DRAWINGS

Figure 7:
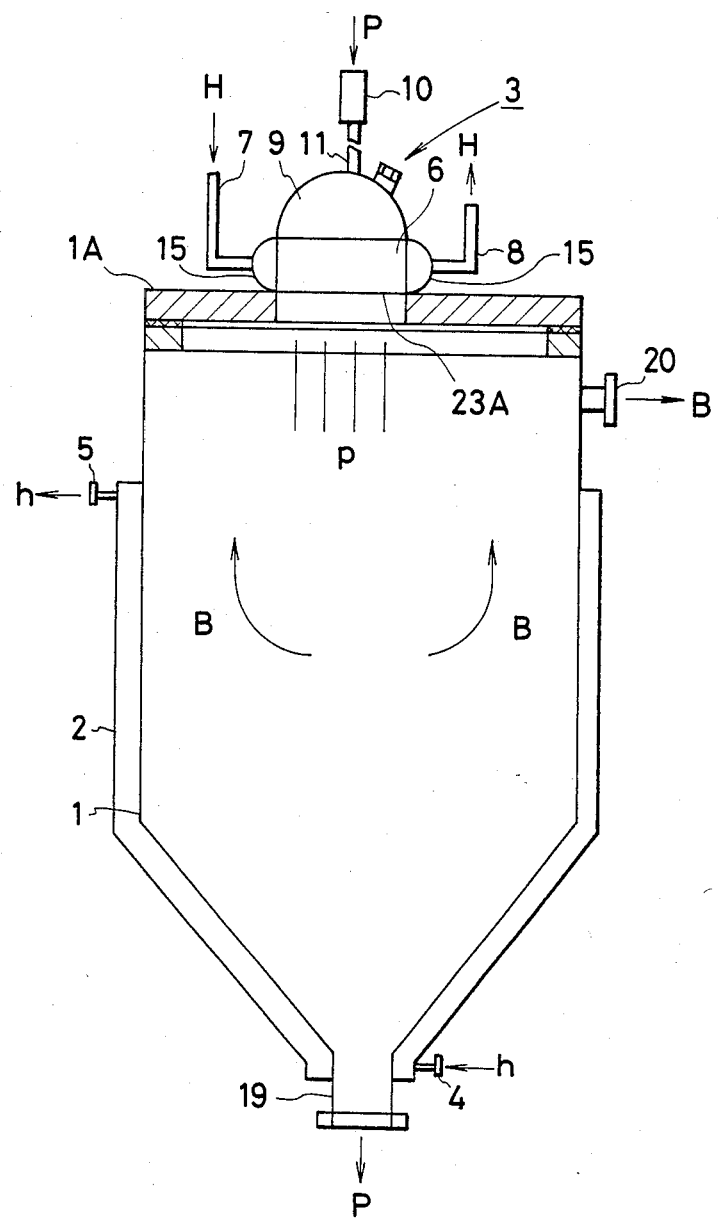
Figure 8:
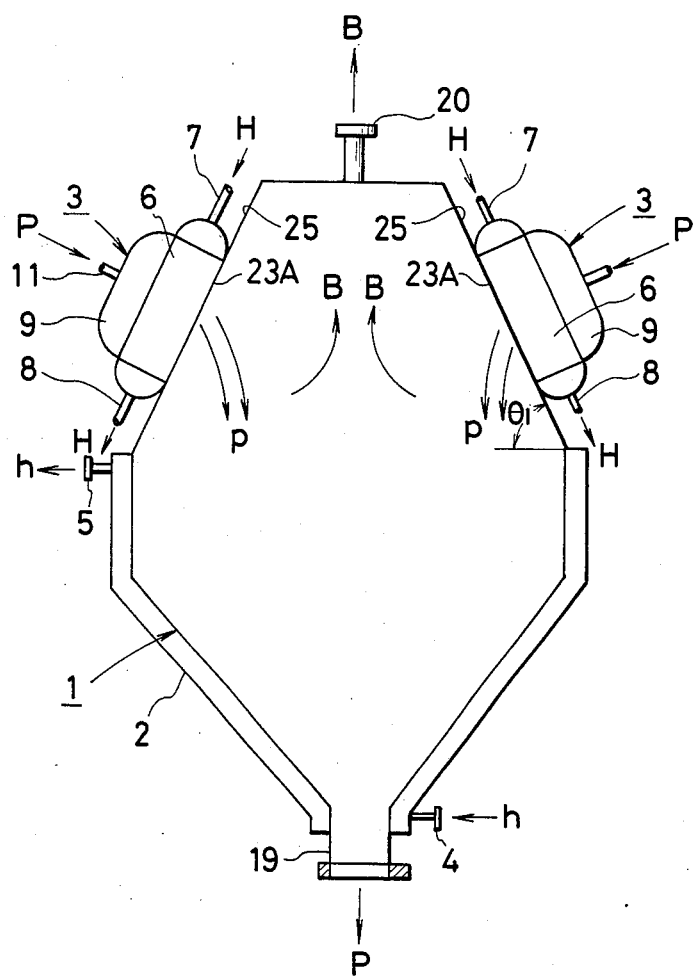
Figure 9:
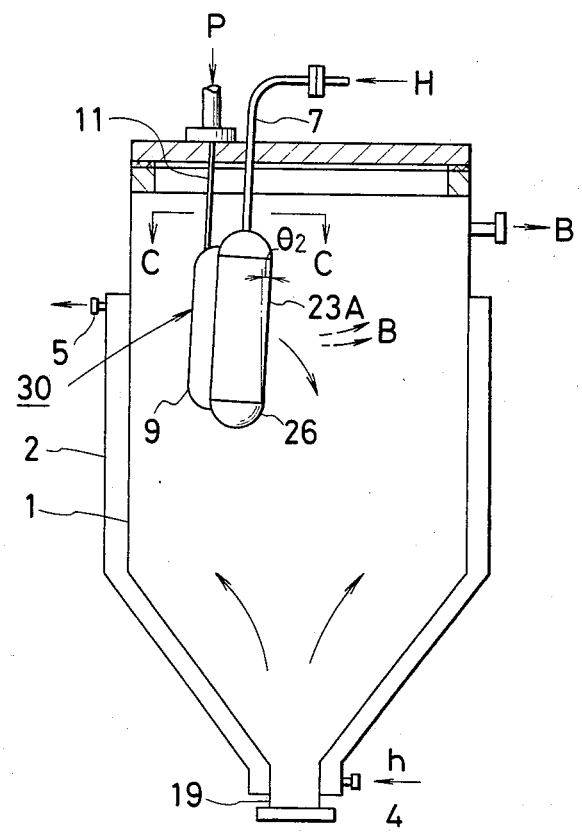
Figure 11:
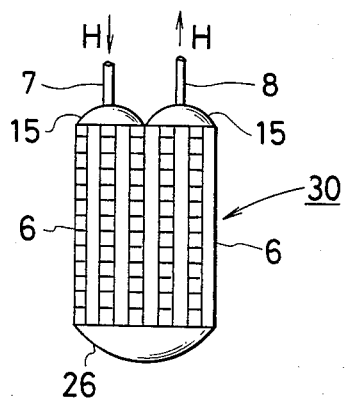
Figure 10:
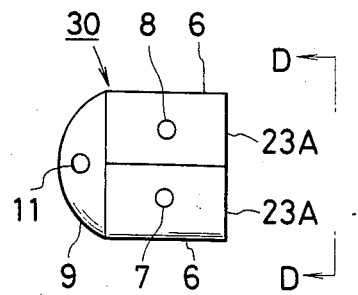
Figure 12:
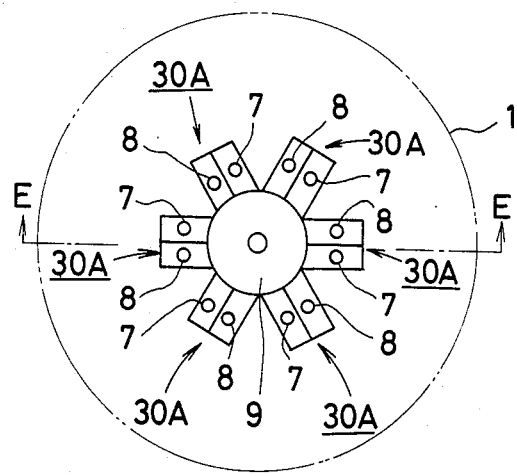
Figure 13:
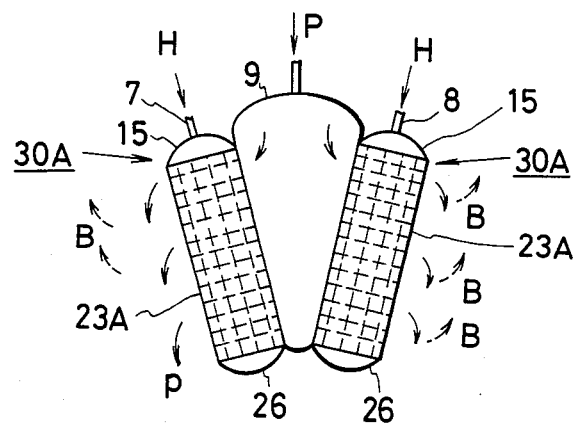

FIGS. 7 to 9 respectively represent a further embodiment of the invention and respectively show a side elevation, partly in section, of the apparatus of the respective embodiments;

FIG. 10 shows a sectional view taken on the line C—C in FIG. 9;

FIG. 11 shows a sectional view taken on the line D—D in FIG. 10;

FIG. 12 represents a modified example of the polymer discharge device and shows a top plan view thereof; and FIG. 13 is a sectional view taken on the line E—E in FIG. 12.

THE PREFERRED EMBODIMENTS

Figure 1:
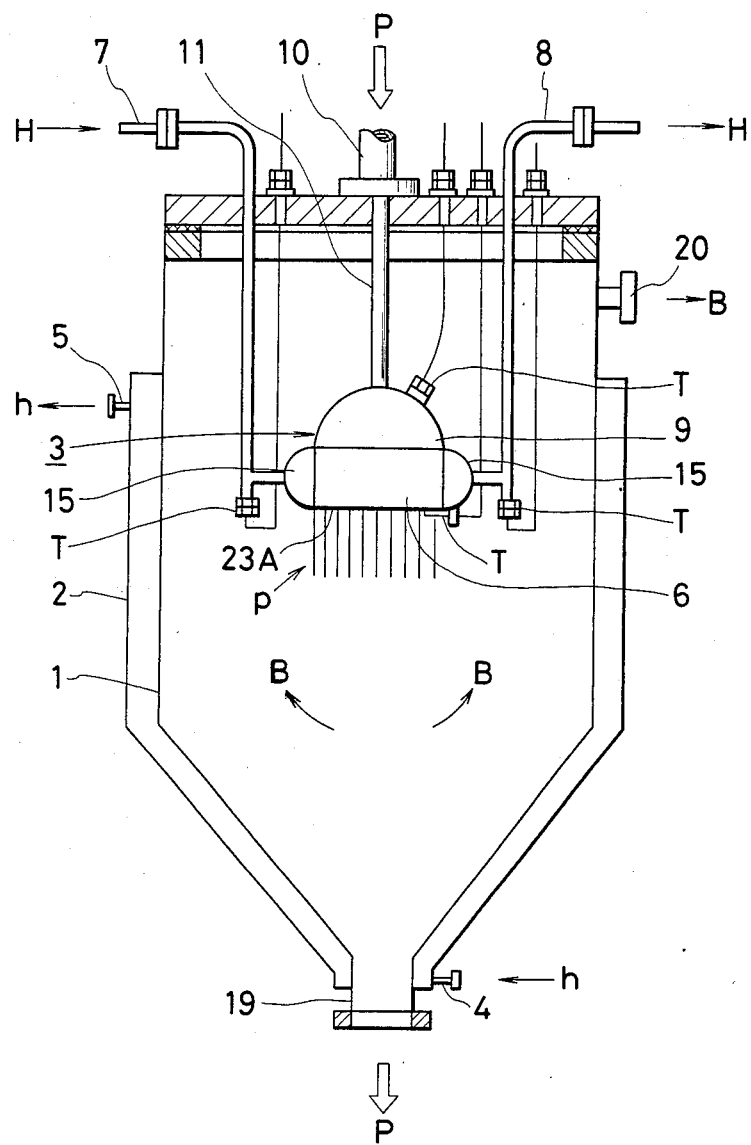
FIG. 1 is a side elevation, partly in section, of a first embodiment of the apparatus for removing volatile matters contained in polymers, according to the present invention.
Figure 2:
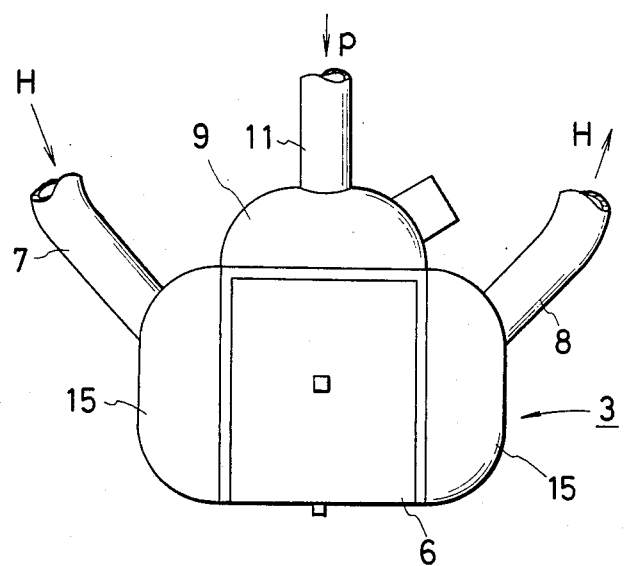
FIG. 2 is a side elevation of a polymer discharge device in the apparatus of FIG. 1.
Figure 3:
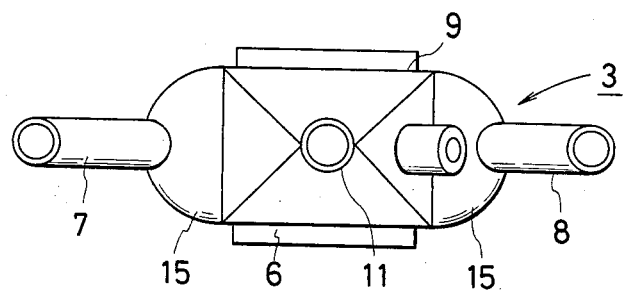
FIG. 3 is a top plan view of the polymer discharge device.
Figure 4:
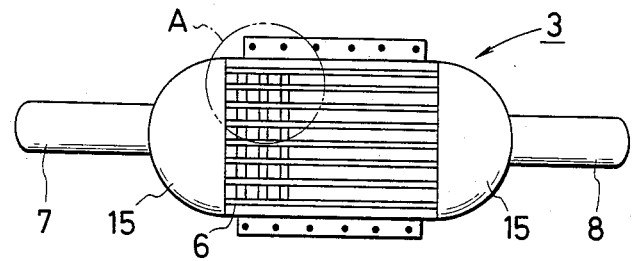
FIG. 4 is a bottom plan view of the polymer discharge device.

FIGS. 1 to 6 of the accompanying drawings altogether represent a first one of the preferred embodiments of the present invention, and initially as shown in FIG. 1, the apparatus for removing volatile matters from polymers containing such matters, according to this embodiment, comprises a decompression vessel 1 provided with a heating jacket 2, and a polymer discharge device 3 mounted in the vessel 1. From a supply opening 4 provided at a lower end portion of the jacket 2, a heating medium h is supplied into the jacket 2 so as to heat the vessel 1 to the prescribed temperature, and it is discharged out of the jacket 2 through a discharge opening 5 provided at an upper end portion of the vessel 1. In this embodiment, the polymer discharge device 3 has a discharge end face 23A facing below or toward the bottom of the decompression vessel. As shown in FIG. 2 through FIG. 4, then, the polymer discharge device 3 comprises a main body 6, a polymer chamber 9 communicated with the main body and heating medium chambers 15 disposed at side ends of the main body 6.

Figure 5:
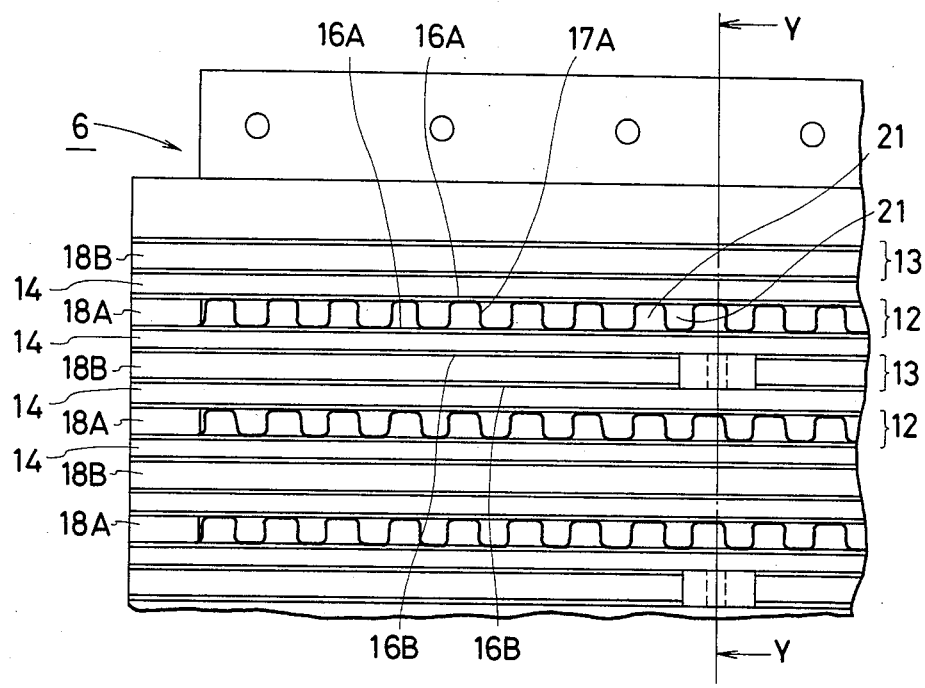
FIG. 5 shows in an enlarged scale the encircled portion A in FIG. 4.
Figure 6:
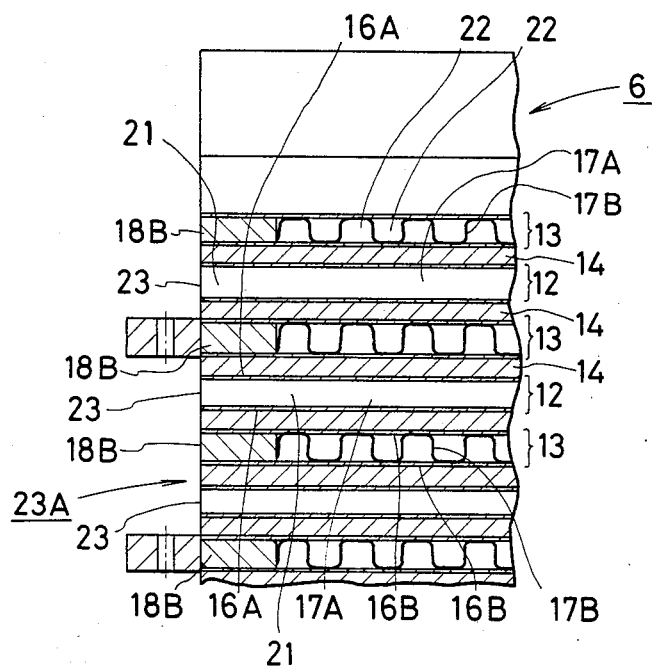
FIG. 6 is a sectional view taken on the line Y—Y in FIG. 5.

As shown in FIGS. 5 and 6, the main body 6 of the polymer discharge device 3 includes polymer passage units 12 and heating-medium passage units 13, the latter constituting means for heat-treating polymers containing volatile matters. Units 12 and units 13 are separated from one another by partition walls 14 and arranged alternately in a plan view as in FIG. 5 and in an overlapping relationship in a sectional view as in FIG. 6. Each polymer passage unit 12 is formed by a pair of plates or walls 16A spaced from each other and a wave-shaped fin 17A supported between the pair of plates or walls 16A and 16A. Similar to the above, each heating-medium passage unit 13 comprises a pair of plates or walls 16B and a wave-shaped fin 17B held between the pair of plates or walls 16B and 16B. Side ends of each unit 12 and those of each unit 13 are closed by end bars 18A and 18B respectively.

By the fin 17A supported between the pair of walls 16A and 16A, a number of polymer passages 21 are provided in each unit 12 and, similar to this, by the fin 17B held between the pair of walls 16B and 16B, a number of heating-medium passages 22 are formed in each unit 13. The polymer passage units 12 and heating-medium passage units 13 are assembled in a manner such that the polymer passages 21 of the former and the heating medium passages 22 of the latter cross one another at right angles. One end of each polymer passage 21 is communicated with the polymer chamber 9, while the other end thereof is made a discharge opening 23, and ends of each heating-medium passage 22 are communicated with the heating medium chambers 15. The polymer discharge device 3 has the above-mentioned discharge end face 23A on this side thereof at which the polymer passages 21 are open as the discharge openings 23.

FIG. 1 further shows that a heating-medium supply pipe 7 is connected to the left-hand one of heating medium chambers 15, while a discharge pipe 8 is connected to the right-hand chamber 15. The heating medium indicated at H is introduced through the supply pipe 7 into the heating-medium passages 22 and, as it is sent through the passages 22, heats the polymer indicated at P, present in the polymer passages 21, to the prescribed temperature and is then discharged via the discharge pipe 8.

Also in FIG. 1, the polymer chamber 9 is connected to an inlet nozzle 10 through a pipe 11, and the polymer P charged via the inlet nozzle 10 into the polymer chamber 9 is heated to the prescribed temperature through its passage through the polymer passages 21, by the heating medium H passed through the passages 22, and is then discharged through discharge openings 23 into the vessel 1 the inside of which is maintained in a reduced pressure condition. Instantaneously as the polymer P is discharged into the decompression vessel 1 as above, volatile matters B contained in the polymer undergo evaporation, and the polymer P removed of volatile matters B by evaporation of the latter is taken out of the decompression vessel or pressure-reduced vessel 1 through a discharge opening 19 provided at a bottom portion of the vessel 1, while the liberated volatile matters B are also taken out of the vessel 1 but through a discharge opening 20 provided at an upper portion of the vessel 1. The reference symbol T in FIG. 1 denotes a temperature detecting device.

FIG. 7 represents a second one of the preferred embodiments of the present invention, and as shown therein, the polymer discharge device 3 in this embodiment is mounted on a top end wall 1A of the decompression vessel 1 in a manner of its discharge end face 23A facing below or toward the bottom of the vessel 1. Same constituents of the invention as in the first embodiment described above in conjunction with FIGS. 1 through 6 are shown by same reference characters in FIG. 7, and the same as this applies to the below entered description of further embodiments of the invention.

FIG. 8 illustrates a third preferred embodiment of the present invention, in which the decompression vessel 1 comprises a spindle-shaped body having inclined faces 25 in an upper portion thereof, and a plurality of the polymer discharge device 3 are mounted on the inclined faces 25. Each polymer discharge device 3 has its discharge end face 23A facing the inside of the decompression vessel 1. The inclined faces 25 of the vessel 1 have an angle of inclination $\theta_1$, which is so set as not to permit it to take place that immediately after it is discharged through discharge openings 23, the polymer P undergoes contact with the inner wall surface of the vessel 1.

FIG. 9 shows a fourth embodiment of the invention, in which the polymer discharge device which is now indicated at 30 is disposed inside the decompression vessel 1, and the discharge device 30 has its discharge end face 23A arranged at an angle of inclination $\theta_2$, which can be 0° if so desired. Further, as shown in FIGS. 10 and 11, the discharge device 30 comprises a plurality of main bodies 6 which are closely juxtaposed. In the illustrated embodiment, the discharge device comprises two juxtaposed main bodies 6 and the heating medium chamber 15 is provided on the top of each main body 6. The heating-medium supply pipe 7 and discharge pipe 8 are communicated with one and the other of the two heating medium chambers 15, respectively. Also, the two main bodies 6 are communicated with each other at their bottoms through a communication passage 26.

FIGS. 12 and 13 in combination show a modified example of the polymer discharge device, which is now shown by 30A and which is of a structure comparable to that of the discharge device 30 shown in FIGS. 10 and 11 except that the polymer chamber 9 of the device 30 is now modified. In this example, the polymer chamber 9 comprises a conical body, and on the peripheral surface thereof, a number of discharge devices 30A are mounted in a radially juxtaposed arrangement.

As many apparently different embodiments of the present invention may be made without departing from the spirit and scope thereof, it is to be understood that the invention is not limited to the specific embodiments thereof except as defined in the appended claims.

We claim:

1. Apparatus for producing a continuous polymer product and removing volatile matters contained therein comprising:
    a polymer chamber;
    a decompression vessel;
    a heating medium source means; and
    a polymer discharge device having a main body with an inlet end face connected to said polymer chamber and a discharge end face open to an interior of said decompression vessel, said main body being formed by a plurality of adjacent plates spaced apart by elongate fins extending between each pair of adjacent plates providing a plurality of passageways therebetween, wherein the fins spacing alternate pairs of said adjacent plates extend in one direction and the fins spacing intermediate pairs of said adjacent plates between said alternate pairs extend in a second direction oriented at an angle relative to said one direction;
    whereby said plurality of passageways defined between each alternate pair of adjacent plates provide polymer passageways between said inlet end face and said discharge end face of said main body and said plurality of passageways defined between each intermediate pair of adjacent plates provide angularly disposed passageways for a heating medium between said polymer passageways supplied thereto by said heating medium source means.

2. The apparatus defined by claim 1 wherein the fins spacing said intermediate pairs of adjacent plates are oriented at an angle of about 90° relative to said one direction of said elongate fins spacing said alternate pairs of adjacent plates.

3. The apparatus defined by claim 1, wherein said elongate fins comprise wave shaped panels.

4. The apparatus defined by claim 3 wherein the wave shaped panels spacing said intermediate pairs of adjacent plates are oriented substantially at 90° relative to said one direction of the wave shaped panels spacing said alternate pairs of adjacent plates.

5. The apparatus defined by claim 1, wherein one end of each said elongate fin providing said polymer passageways is coterminous with said discharge end face and said apparatus produces a plurality of continuous strands of polymer.

6. The apparatus defined by claim 1 wherein the elongate fins providing said polymer passageways terminate short of said discharge end face and said apparatus produces a continuous sheet of polymer.

7. The apparatus defined by claim 1 wherein said polymer discharge device is provided internally of said decompression vessel.

8. The apparatus as defined by claim 1, wherein said decompression vessel has a spindle-shaped body with inclined faces on an upper portion thereof and a plurality of said polymer discharge devices are mounted on said inclined faces with their discharge end faces inclined toward the bottom of said decompression vessel.

9. The apparatus as defined by claim 7, wherein a plurality of polymer discharge devices are radially arranged internally of said decompression vessel and each is mounted in a position inclined toward below.

10. The apparatus as defined by claim 9, wherein each of said polymer discharge devices comprises two juxtaposed main bodies, one of which is provided at its respective one end with said heating-medium source and communicated to the other main body through a communication passage, and said polymer chamber is provided on the rear of said main bodies.

* * * * *